(12) United States Patent
Ueno (10) Patent No.: US 9,194,445 B2
(45) Date of Patent: Nov. 24, 2015

(54) DRIVING DEVICE, ELECTRONIC APPARATUS PROVIDED WITH THE DRIVING DEVICE, AND DRIVING DEVICE CONTROL METHOD

(71) Applicant: KYOCERA Document Solutions Inc., Osaka (JP)

(72) Inventor: Daijiro Ueno, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 170 days.

(21) Appl. No.: 14/163,057

(22) Filed: Jan. 24, 2014

(65) Prior Publication Data

US 2014/0213411 A1     Jul. 31, 2014

(30) Foreign Application Priority Data

Jan. 30, 2013   (JP) ................. 2013-015420

(51) Int. Cl.
 *H02P 15/02* (2006.01)
 *F16D 27/14* (2006.01)

(52) U.S. Cl.
 CPC .............. *F16D 27/14* (2013.01); *Y10T 477/32* (2015.01)

(58) Field of Classification Search
 None
 See application file for complete search history.

(56) References Cited

U.S. PATENT DOCUMENTS

| 5,628,704 A * | 5/1997 | Fischler et al. ............ 477/5 |
| 8,925,701 B1 * | 1/2015 | Dube et al. .............. 192/3.51 |

FOREIGN PATENT DOCUMENTS

| JP | 06-214498 | 8/1994 |
| JP | 2007-162748 | 6/2007 |
| JP | 2011-152976 | 8/2011 |

* cited by examiner

*Primary Examiner* — Dirk Wright
(74) *Attorney, Agent, or Firm* — Wenderoth, Lind & Ponack, L.L.P.

(57) ABSTRACT

A driving device includes a motor control unit and a clutch control unit. When the motor control unit stops a motor from an operating state, the clutch control unit controls the energization and de-energization of an exciting coil of each of electromagnetic clutches so as to switch one or more but not all of the electromagnetic clutches to a cutoff state while keeping the remaining electromagnetic clutches in a connected state.

4 Claims, 7 Drawing Sheets

DRIVING DEVICE, ELECTRONIC APPARATUS PROVIDED WITH THE DRIVING DEVICE, AND DRIVING DEVICE CONTROL METHOD

CROSS-REFERENCE TO RELATED APPLICATION(S)

This application is based upon and claims the benefit of priority from Japanese Patent Application (s) No. 2013-015420 filed on Jan. 30, 2013, the entire contents of which are incorporated herein by reference.

BACKGROUND

The technology of the present disclosure relates to a driving device, an electronic apparatus provided with the driving device and a driving device control method.

In the related art, there is well-known a driving device in which electromagnetic clutches are installed in power delivery routes between a motor and a plurality of driven bodies.

The driving device includes, as the driven bodies, e.g., a conveying roller pair and a register roller pair of an image forming apparatus. A conveying roller clutch is installed in a power delivery route between the motor and the conveying roller pair. A register roller clutch is installed in a power delivery route between the motor and the register roller pair. The conveying roller clutch and the register roller clutch are formed of electromagnetic clutches.

Furthermore, the driving device includes, as the driven bodies, e.g., a photosensitive drum and a flywheel. The photosensitive drum and the flywheel are disposed in a coaxial relationship with a drive shaft. A flywheel clutch is installed in a power delivery route between the motor and the flywheel. In this driving device, when driving the photosensitive drum, the flywheel is connected to the drive shaft by the flywheel clutch. On the other hand, when urgently stopping the photosensitive drum, the connection is cut off by the flywheel clutch. The flywheel clutch is formed of an electromagnetic clutch.

As one example of the electromagnetic clutches, there is known an electromagnetic clutch that includes an input gear driven by a motor, an armature connected to the input gear so as to rotate together with the input gear, a rotor disposed in a coaxial relationship with the armature, an output member for interconnecting the rotor and a driven body, and an exciting coil for generating a magnetic force. In this electromagnetic clutch, if the exciting coil energized, the armature is pressed against the rotor by the magnetic force generated due to the energization. Thus, the power of the motor is delivered to the output member through the input gear, the armature and the rotor. On the other hand, if the exciting coil is de-energized, the armature is moved away from the rotor by a biasing spring. Consequently, the power delivery from the motor to the output member is cut off.

SUMMARY

A driving device according to one aspect of the present disclosure includes a motor and a plurality of electromagnetic clutches. The electromagnetic clutches are respectively installed in a power delivery route between the motor and a plurality of driven bodies. Each of the electromagnetic clutches includes an input member, an armature, a rotor, an output member and an exciting coil. The input member is driven by the motor. The armature is connected to the input member so as to rotate together with the input member. The rotor is arranged in a coaxial relationship with the armature. The output member interconnects the rotor and each of the driven bodies so as to rotate together. The exciting coil is a coil for generating a magnetic force.

The driving device further includes a motor control unit and a clutch control unit.

The motor control unit is configured to control an operation of the motor. The clutch control unit is configured to, by controlling energization and de-energization of the exciting coil of each of the electromagnetic clutches, selectively switch each of the electromagnetic clutches to a connected state and a cutoff state. The connected state is a state in which the armature and the rotor are connected to each other. The cutoff state is a state in which the connection of the armature and the rotor is cut off. When the motor control unit stops the motor from an operating state, the clutch control unit controls the energization and de-energization of the exciting coil of each of the electromagnetic clutches so as to switch a part of the electromagnetic clutches to the cutoff state while keeping the remaining electromagnetic clutches in the connected state.

An electronic apparatus according to another aspect of the present disclosure includes the driving device mentioned above.

A control method according to a further aspect of the present disclosure controls a driving device as a control target, which includes a motor and a plurality of electromagnetic clutches. The electromagnetic clutches are respectively installed in a power delivery route between the motor and a plurality of driven bodies. In the control method, when the motor is stopped from an operating state, energization and de-energization of an exciting coil of each of the electromagnetic clutches is controlled so as to switch a part of the electromagnetic clutches to a cutoff state while keeping the remaining electromagnetic clutches in a connected state.

DETAILED DESCRIPTION

An image forming apparatus as one example of an electronic apparatus according to the present embodiment will now be described in detail with reference to the accompanying drawings. The technology of the present disclosure is not limited to the following embodiment.

Figure 1:
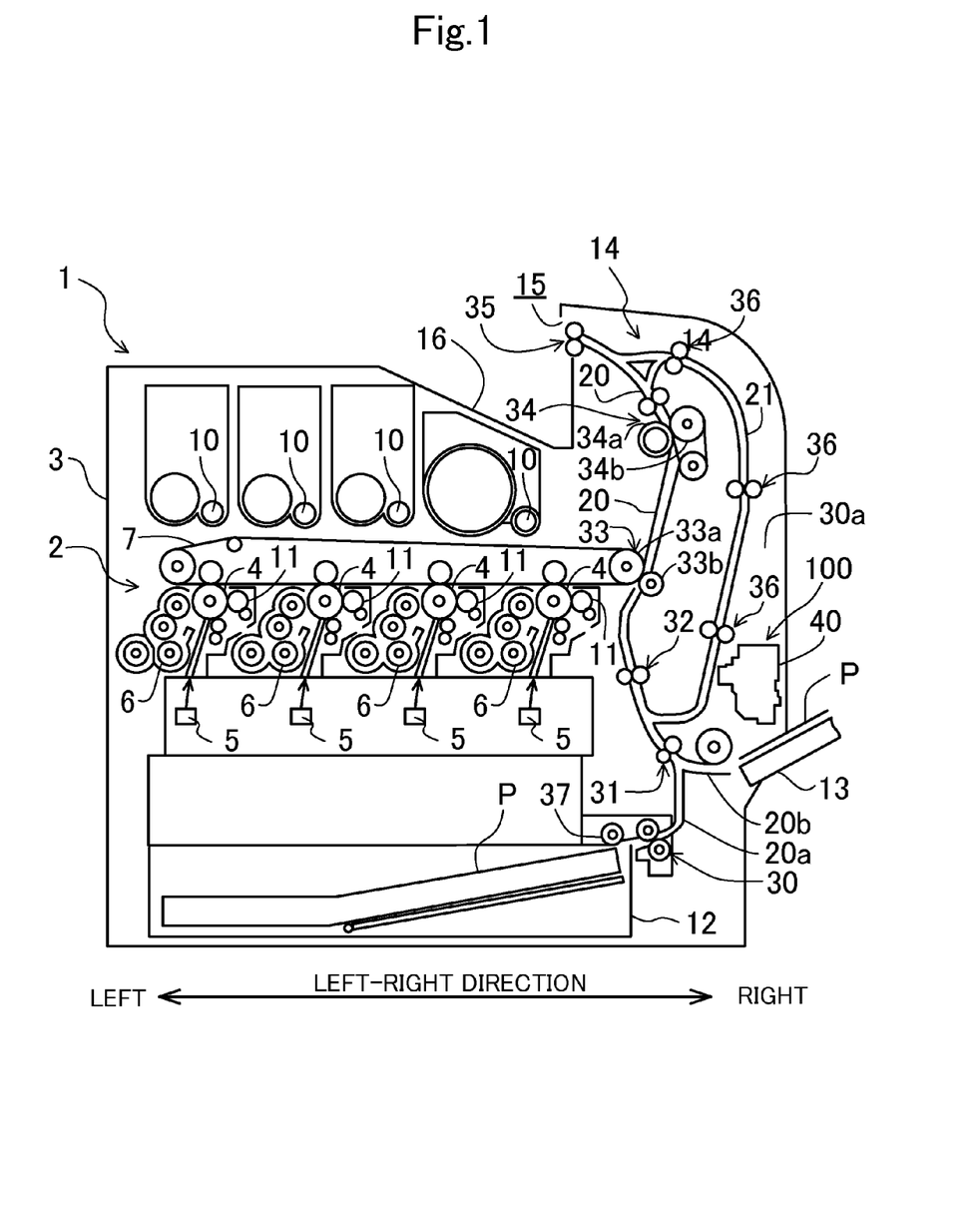
FIG. 1 is a sectional view taken along a left-right direction, showing an image forming apparatus provided with a driving device according to one embodiment.

FIG. 1 shows an image forming apparatus 1 as one example of an electronic apparatus according to the present embodiment. The image forming apparatus 1 is a so-called laser printer. The image forming apparatus 1 includes an image forming unit 2 for forming a tonner image on a paper P. In the following description, the "right side" and the "left side" mean the right side and the left side of the image forming apparatus 1 (the right side and the left side in FIG. 1), respectively. The "front side" and the "rear side" mean the front side and the rear side of the image forming apparatus 1 (the front side and the back side perpendicular to the drawing sheet plane in FIG. 1), respectively. The "upstream side" and the "downstream side" mean the upstream side and the downstream side in the conveying direction of the paper P.

The image forming apparatus 1 as a whole is covered with a housing 3. The image forming unit 2 is installed in a vertical intermediate region within the housing 3. The image forming apparatus 1 includes photosensitive drums 4 of four colors, yellow, magenta, cyan and black, and scanners 5 for irradiating laser light on the surfaces of the respective photosensitive drums 4 to form electrostatic images. After the electrostatic images formed on the surfaces of the respective photosensitive drums 4 are developed by a developing unit 6, the image forming unit 2 transfers the developed electrostatic images to the paper P through a transfer belt 7 and a transfer roller 33a. The tonner image transferred to the paper P in this manner is heated and fixed to the paper P by a fixing roller pair 34 which will be described later. Reference symbol 10 in FIG. 1 designates a toner supply unit for supplying a toner to the developing unit 6. Reference symbol 11 designates a cleaning roller for cleaning the photosensitive surfaces of the photosensitive drums 4.

A paper feeding cassette 12 which retains papers P is installed below the image forming unit 2. A manual insertion tray 13 for enabling a user to manually insert and set a paper P is installed in the right wall of the housing 3. A paper conveying unit 14 for conveying the paper P is installed at the right side of the image forming unit 2 within the housing 3. A paper discharge hole 15 for discharging the paper P conveyed by the paper conveying unit 14 to the outside of the image forming apparatus 1 is formed in the upper portion of the housing 3. A paper discharge tray 16 for catching the paper P discharged from the paper discharge hole 15 is formed on the upper surface of the housing 3.

The paper conveying unit 14 includes first and second conveying routes 20 and 21 extending substantially in an up-down direction.

The first conveying route 20 is a route for conveying the paper P supplied from the paper feeding cassette 12 or the manual insertion tray 13. The upper end of the first conveying route 20 is connected to the paper discharge hole 15 formed in the upper portion of the housing 3. The lower end of the first conveying route 20 is bifurcated into two branch routes 20a and 20b. The branch route 20a extends toward the paper feeding cassette 12, and the branch route 20b extends toward the manual insertion tray 13.

The second conveying route 21 is a route for, when performing double side printing on the paper P, returning the one-side-printed paper P switched back by a paper discharge roller pair 35 to the first conveying route 20. The second conveying route 21 is branched from the upper end portion of the first conveying route 20 so as to extend downward. Then, the second conveying route 21 is connected to the lower end portion of the first conveying route 20.

In the first conveying route 20, a paper feeding roller pair 30, an intermediate roller pair 31, a register roller pair 32, a transfer roller pair 33, a fixing roller pair 34 and a discharge roller pair 35 are installed in the named order from the upstream side toward the downstream side. In the second conveying route 21, three double-side printing roller pairs 36 are installed along the paper conveying direction. In the respective conveying routes 20 and 21, there are installed paper detecting sensors for detecting the paper P not shown. The respective roller pairs 30 to 36 pinch the paper P and convey the paper P from the upstream side toward the downstream side. The respective roller pairs 30 to 36 are driven by a driving device 100. Details of the driving device 100 will be described later.

Next, the operation of the image forming apparatus 1 will be briefly described. The paper P set in the paper feeding cassette 12 is sent to the first conveying route 20 by the feed roller 37 and the paper feeding roller pair 30. Thereafter, the paper P is conveyed to the register roller pair 32 by the intermediate roller pair 31. In the register roller pair 32, the paper P is subjected to skew correction. The paper P discharged from the register roller pair 32 is introduced into between the transfer roller 33a of the transfer roller pair 33 and the transfer belt 7. Thus, the tonner image of the transfer belt 7 is transferred to the paper P. Thereafter, the paper P discharged from between the transfer roller 33a and the transfer belt 7 is conveyed to the fixing roller pair 34. In the fixing roller pair 34, the toner is melted in a fixing nip formed between fixing rollers 34a and 34b and is fixed to the paper P. In this manner, the tonner image is printed on the paper P. The paper P discharged from the fixing roller pair 34 is guided to the paper discharge hole 15 by the discharge roller pair 35 and is discharged to the paper discharge tray 16. In case where the paper is supplied from the manual insertion tray 13, printing is performed in the same procedure as mentioned above.

When performing double-side printing, the paper P discharged from the fixing roller pair 34 is switched back by the discharge roller pair 35 and is fed to the second conveying route 21. Thereafter, the paper P is conveyed to the downstream side by three double-side printing roller pairs 36 and is returned to the first conveying route 20 where rear side printing is performed.

Configuration of Driving Device

Figure 2:
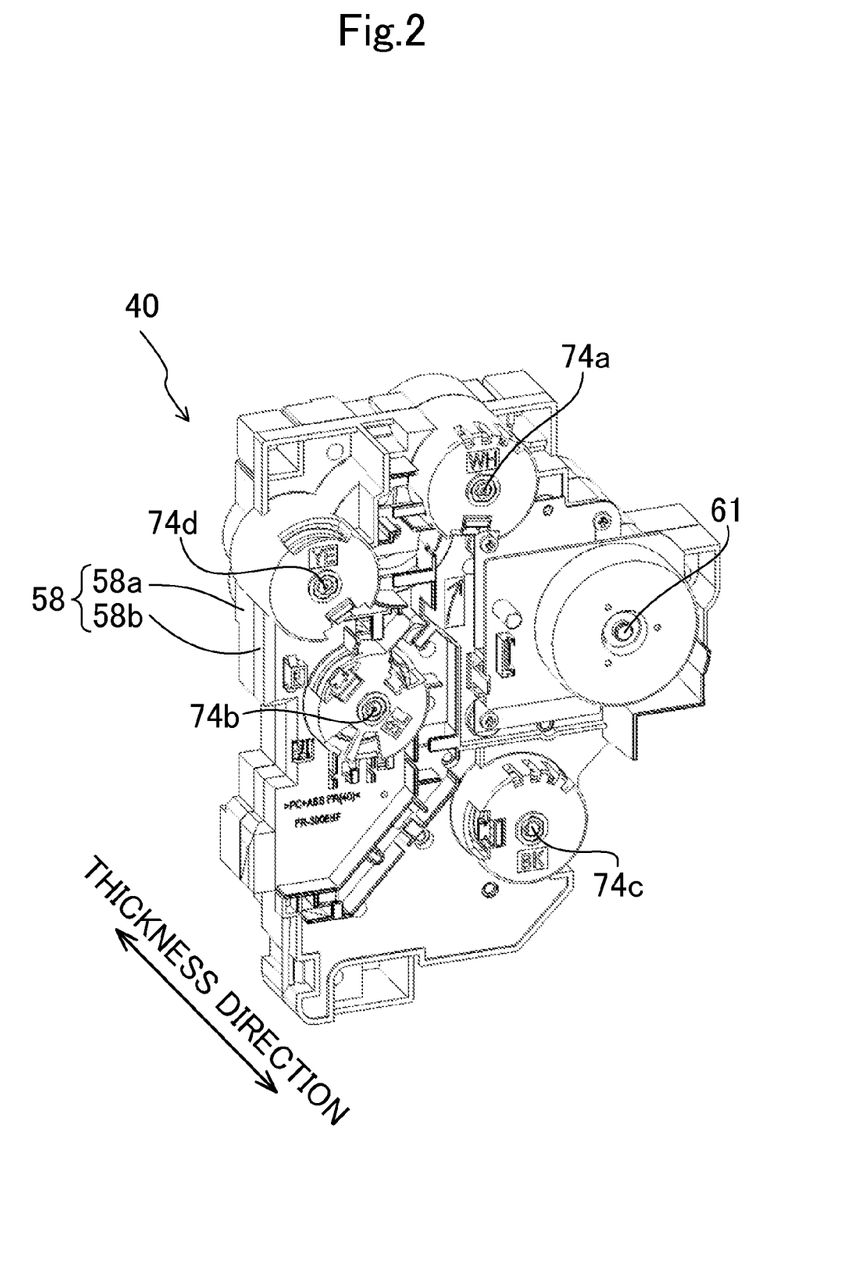
FIG. 2 is an external perspective view sowing a drive unit.
Figure 3:
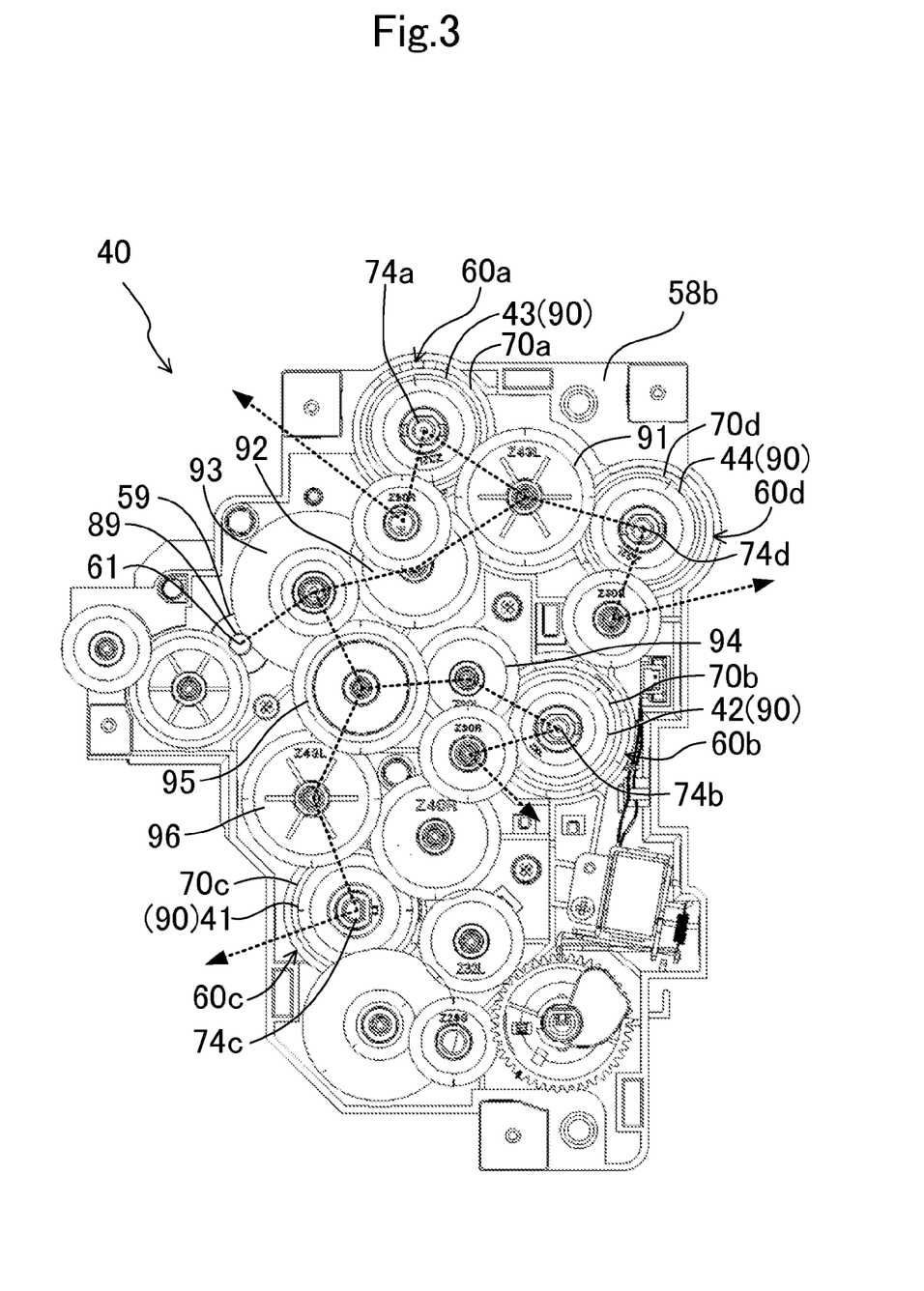
FIG. 3 is a plan view seen in a thickness direction of the drive unit, showing the interior of the drive unit.

Next, description will be made on the driving device 100 for driving the respective roller pairs 30 to 36 installed in the respective conveying routes 20 and 21. As shown in FIGS. 1 to 3, the driving device 100 includes a driving unit 40 attached to the rear wall 30a of the housing 3. The driving unit 40 is configured to drive a paper feeding roller gear 41 (see FIG. 3) for driving the paper feeding roller pair 30, an intermediate roller gear 42 for driving the intermediate roller pair 31, a register roller gear 43 for driving the register roller pair 32 and a double-side printing roller gear 44 for driving the double-side printing roller pairs 36.

FIG. 3 shows the internal structure of the driving unit 40. The driving unit 40 includes a motor 59 as a drive source, a register roller clutch 60a, an intermediate roller clutch 60b, a paper feeding roller clutch 60c and a double-side printing roller clutch 60d. The broken lines in FIG. 3 indicate the delivery routes of the power outputted from the motor 59 via the clutches 60a to 60d. The motor 59 and the clutches 60a to 60d are arranged within a single case 58 and are formed into a unit. The case 58 is divided into one case portion 58a and the other case portion 58b along the thickness direction thereof (see FIG. 2).

Figure 4:
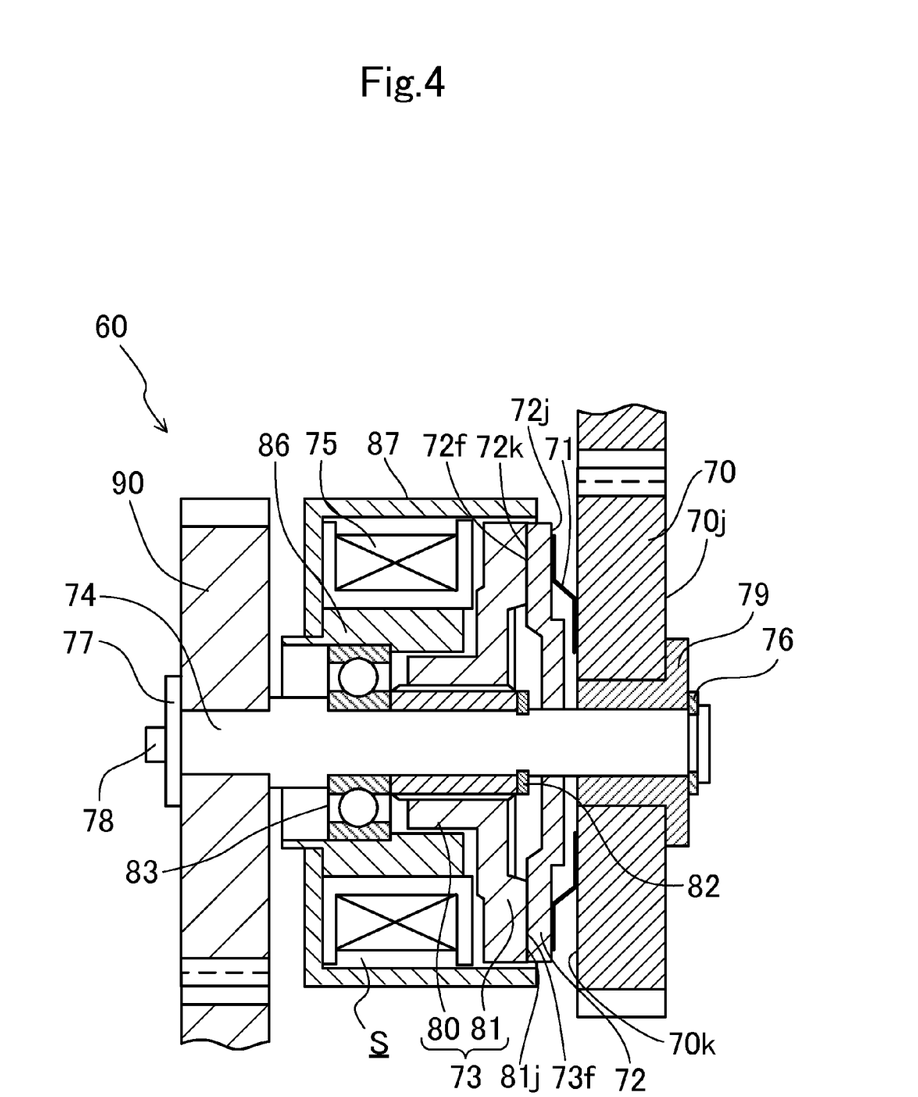
FIG. 4 is a sectional view taken along an axis, showing an electromagnetic clutch.

The clutches 60a to 60d are formed of an electromagnetic clutch 60 that switches delivery and cutoff of power using an electromagnetic force. As shown in FIG. 4, the electromagnetic clutch 60 includes an input gear 70 as an input member, an armature 72, a rotor 73, an output shaft 74 as an output member and an exciting coil 75. The armature 72 is formed into a ring shape. The armature 72 is connected to the input gear 70 through a spring member 71. Thus, the armature 72 is rotated together with the input gear 70. The rotor 73 is disposed in a coaxial relationship with the armature 72. The output shaft 74 is connected to the rotor 73 so as to rotate together with the rotor 73. The exciting coil 75 generates a magnetic force for drawing the armature 72 toward the rotor 73. The armature 72 and the rotor 73 are made of a metallic material.

The input gear 70 is rotatably supported on one end portion of the output shaft 74 through a slide bush 79. One side surface 70*j* of the input gear 70 makes contact with a flange portion of the slide bush 79. The axial movement of the slide bush 79 is restrained by a snap ring 76. The input gear 70 includes input gears 70*a* to 70*d* of the clutches 60*a* to 60*d* which will be described later.

A paper feeding roller gear 41, an intermediate roller gear 42, a register roller gear 43 or a double-side printing roller gear 44, which serves as a driven body 90, is connected and fixed to the other end portion of the output shaft 74. The axial movement of the driven body 90 is restrained by a washer 77 and a bolt 78.

The spring member 71 is formed of a disc spring which forms a ring shape when seen in the axial direction. The inner peripheral edge portion of the spring member 71 is fixed to the other side surface 70*k* of the input gear 70. The outer peripheral edge portion of the spring member 71 is fixed to one side surface 72*j* of the armature 72. A friction-engaging portion 72*f* is provided on the other side surface 72*k* of the outer peripheral edge portion of the armature 72.

The rotor 73 includes a small-diameter portion 80 and a large-diameter portion 81 extending radially outward from one end portion of the small-diameter portion 80. The large-diameter portion 81 is formed into an annular flat shape. A friction-engaging portion 73*f* is provided on one side surface 81*j* of the outer peripheral edge portion of the large-diameter portion 81. The small-diameter portion 80 is connected to the output shaft 74 by spline fit. Thus, the small-diameter portion 80 rotates together with the output shaft 74. The small-diameter portion 80 is interposed between a snap ring 82 and an inner race of a spring 83. Thus, the axial relative movement of the small-diameter portion 80 with respect to the output shaft 74 is restrained. The inner race of the bearing 83 is fitted and connected to the output shaft 74. Thus, the inner race of the bearing 83 rotates together with the output shaft 74. An outer race of the bearing 83 is fitted to an inner circumferential surface of a yoke 86. One end portion of the yoke 86 is connected to a bottom wall portion of a cylindrical clutch case 87 having a bottom.

The exciting coil 75 is disposed in an annular space S existing between the circumferential wall portion of the clutch case 87 and the yoke 86. The energization and de-energization of the exciting coil 75 is controlled by a controller 50 which will be described later.

In the electromagnetic clutch 60 configured as above, if the exciting coil 75 is energized, the armature 72 is moved toward the rotor 73 against the biasing force of the spring member 71. The friction-engaging portion 72*f* of the armature 72 is connected to the friction-engaging portion 73*f* of the rotor 73. Thus, the power can be delivered from the input gear 70 to the output shaft 74 through the spring member 71, the armature 72 and the rotor 73. On the other hand, if the exciting coil 75 is de-energized, the armature 72 is moved away from the rotor 73 by the biasing force of the spring member 71. Therefore, the power delivery from the input gear 70 to the output shaft 74 is cut off. In the following description, the connected state of the clutches 60*a* to 60*d* means a state in which the armature 72 and the rotor 73 are connected to each other (a state shown in FIG. 4). The cutoff state of the clutches 60*a* to 60*d* means a state in which the connection of the armature 72 and the rotor 73 is cut off.

Referring to FIG. 3, an input gear 70*a* of the register roller clutch 60*a* is connected to an output shaft 61 of the motor 59 through an idle gear 91, an idle gear 92, an idle gear 93 and a pinion gear 89. An output shaft 74*a* of the register roller clutch 60*a* is connected to the register roller gear 43 so as to rotate together with the register roller gear 43.

An input gear 70*b* of the intermediate roller clutch 60*b* is connected to the output shaft 61 of the motor 59 through an idle gear 94, an idle gear 95, the idle gear 93 and the pinion gear 89. An output shaft 74*b* of the intermediate roller clutch 60*b* is connected to the intermediate roller gear 42 so as to rotate together with the intermediate roller gear 42.

An input gear 70*c* of the paper feeding roller clutch 60*c* is connected to the output shaft 61 of the motor 59 through an idle gear 96, the idle gear 95, the idle gear 93 and the pinion gear 89. An output shaft 74*c* of the paper feeding roller clutch 60*c* is connected to the paper feeding roller gear 41 so as to rotate together with the paper feeding roller gear 41.

An input gear 70*d* of the double-side printing roller clutch 60*d* is connected to the output shaft 61 of the motor 59 through the idle gear 91, the idle gear 92, the idle gear 93 and the pinion gear 89. An output shaft 74*d* of the double-side printing roller clutch 60*d* is connected to the double-side printing roller gear 44 so as to rotate together with the double-side printing roller gear 44.

As described above, when kept in the connected state, each of the clutches 60*a* to 60*d* causes the friction-engaging portion 72*f* of the armature 72 and the friction-engaging portion 73*f* of the rotor 73 to make frictional engagement with each other. At this time, for example, if rust adheres to the friction-engaging portions 72*f* and 73*f*, it is sometimes the case that the friction-engaging portion 72*f* of the armature 72 and the friction-engaging portion 73*f* of the rotor 73 are stuck to each other due to the rust. When the sticking force is large, even if the exciting coil 75 is switched from an energized state to a de-energized state by the controller 50, the armature 72 and the rotor 73 are kept stuck and are not moved away from each other. Thus, it is sometimes impossible to switch the clutches 60*a* to 60*d* from a connected state to a cutoff state. As a result, a jam of the paper P occurs. This poses a problem of increasing a work burden borne by a user to cope with the jam.

This problem is more likely to occur if the load torque applied from the driven body 90 to the coupling portion of the armature 72 and the rotor 73 through the output shaft 74 becomes smaller. That is to say, if the load torque is small, when the exciting coil 75 is switched from an energized state to a de-energized state, the shearing torque applied to the coupling portion of the armature 72 and the rotor 73 becomes small. This makes it impossible to obtain a shearing torque large enough to relieve the sticking of the armature 72 and the rotor 73. Thus, it is highly likely that the armature 72 and the rotor 73 are stuck to each other and unable to be moved away from each other.

In the present embodiment, the load torque is measured with respect to each of the clutches 60*a* to 60*d*, thereby specifying in advance the clutch in which sticking is most likely to occur. In order to prevent the clutch from being stuck, the clutch cutoff control to be described later is performed by the controller 50.

The measurement result of the load torque in the present embodiment is as follows. That is to say, there is established a relationship of L1<L2<L3<L4 where L1 is the load torque of the intermediate roller clutch 60*b*, L2 is the load torque of the double-side printing roller clutch 60*d*, L3 is the load torque of the paper feeding roller clutch 60*c* and L4 is the load torque of the register roller clutch 60*a*. Accordingly, the clutch cutoff control according to the present embodiment seeks to relieve the sticking of the intermediate roller clutch 60b in which sticking is most likely to occur (in which the load torque is smallest). Details of the clutch cutoff control will be described later.

Configuration of Controller

Figure 5:
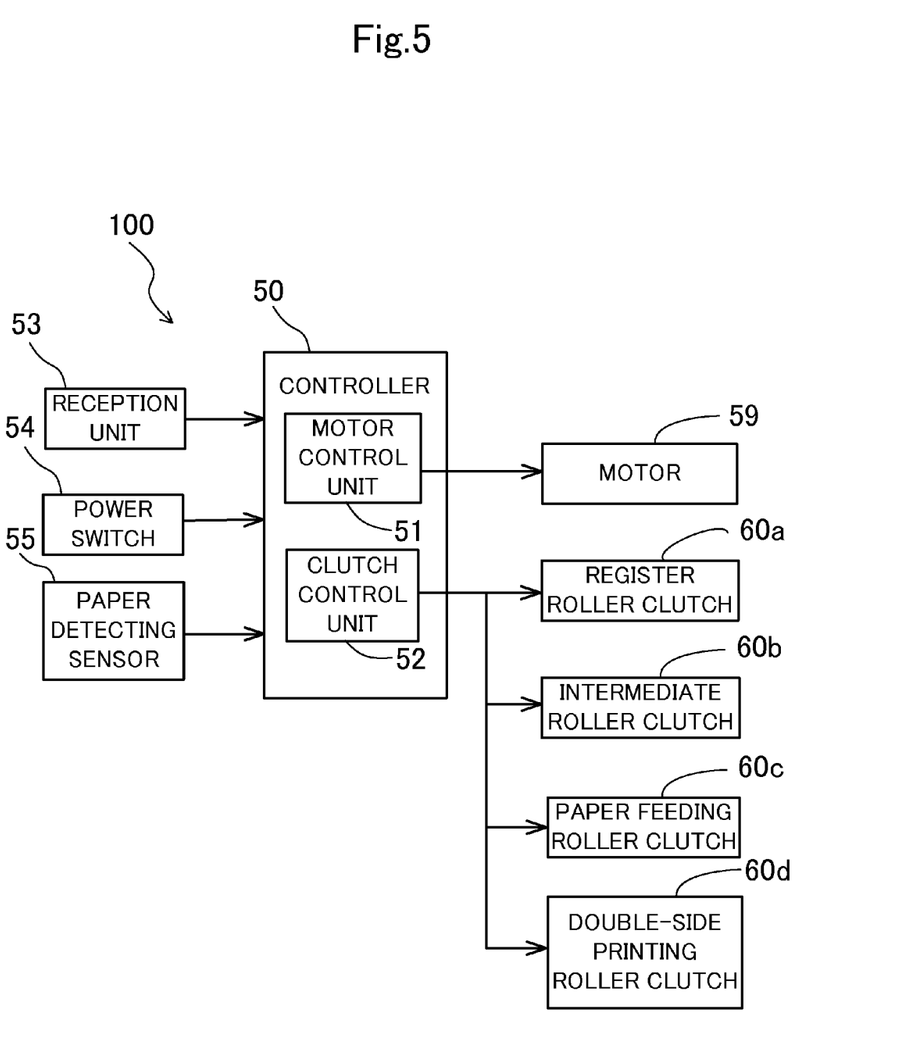
FIG. 5 is a block diagram showing a configuration of a control system of the driving device.

The operations of the clutches 60a to 60d and the motor 59 are controlled by the controller 50 (see FIG. 5). The controller 50 is composed of, e.g., a microcomputer that includes a CPU, a ROM and a RAM.

The controller 50 includes a motor control unit 51 for controlling the operation of the motor and a clutch control unit 52 for controlling the operations of the clutches 60a to 60d. A reception unit 53, a power switch 54, a paper detecting sensor 55 and the like are connected to the controller 50. Responsive to the signals transmitted from the reception unit 53 and the paper detecting sensor 55, the controller 50 controls the operations of the clutches 60a to 60d and the motor 59.

The reception unit 53 receives a user's request from an operation panel or a terminal device. Upon receiving a printing start request from a user, the reception unit 53 outputs a request signal indicating the reception of the printing start request, printing image information and information of number of printing sheets to the controller 50.

The power switch 54 is a switch for turning on or off the power supply of the image forming apparatus 1. The power switch 54 can be on/off operated by a user. The power switch 54 outputs a signal corresponding to an on-operation or an off-operation to the controller 50.

The paper detecting sensor 55 is formed of reflection-type photo coupler sensors (not shown in FIG. 1) respectively installed near the upstream side of the respective roller pairs 30 to 36. Upon detecting a paper, the paper detecting sensor 55 outputs a detection signal to the controller 50.

The motor control unit 51 is electrically connected to the motor 59. If necessary, the motor control unit 51 outputs an operation signal or a stop signal to the motor 59. Based on the signal sent from the power switch 54, the motor control unit 51 determines whether the power switch 54 is turned on or off. If it is determined that the power switch 54 is turned on, the motor control unit 51 outputs an operation signal to the motor 59, thereby rotating the motor 59 at a predetermined rotation speed. On the other hand, if it is determined that the power switch 54 is turned off, the motor control unit 51 outputs a stop signal to the motor 59, thereby starting a process of stopping the motor 59.

The clutch control unit 52 is electrically connected to the exciting coil 75 of each of the clutches 60a to 60d. The clutch control unit 52 controls the energization/de-energization of the exciting coil 75 of each of the clutches 60a to 60d, thereby selectively switching each of the clutches 60a to 60d to a connected state and a cutoff state.

In case where it is determined based on the signal sent from the power switch 54 that the power switch 54 is turned on, if there is an image printing start request, the clutch control unit 52 starts normal operation control for the clutches 60a to 60d. In the normal operation control, the position of the paper P on the conveying routes 20 and 21 is first calculated based on the signal sent from the paper detecting sensor 55. Then, among the roller pairs 30 to 36, the roller pair to be driven is decided based on the calculated conveying position of the paper. One of the clutches 60a to 60d corresponding to the decided roller pair is controlled to come into a connected state while the remaining clutches 60a to 60d are controlled to remain in a cutoff state.

In case where it is determined based on the signal sent from the power switch 54 that the power supply of the image forming apparatus 1 is in an on-state, after an image printing process is finished, the clutch control unit 52 de-energizes the exciting coils 75 of the entire clutches 60a to 60d in order to keep all the clutches 60a to 60d in a cutoff state.

In case where it is determined based on the signal sent from the power switch 54 that the power switch 54 is switched from an on-state to an off-state, after the motor control unit 51 outputs a stop signal to the motor 59, the clutch control unit 52 starts cutoff control of each of the clutches 60a to 60d.

In the cutoff control, only the intermediate roller clutch 60b (one or more but not all of the electromagnetic clutches) is first switched to a cutoff state while the remaining clutches (the register roller clutch 60a, the paper feeding roller clutch 60c and the double-side printing roller clutch 60d) are kept in a connected state. The energization/de-energization of the exciting coils 75 of the clutches 60a to 60d is controlled in such a way that the exciting coils 75 switch all the clutches 60a to 60d to a cutoff state after a predetermined time period is elapsed from the control start time.

Figure 6:
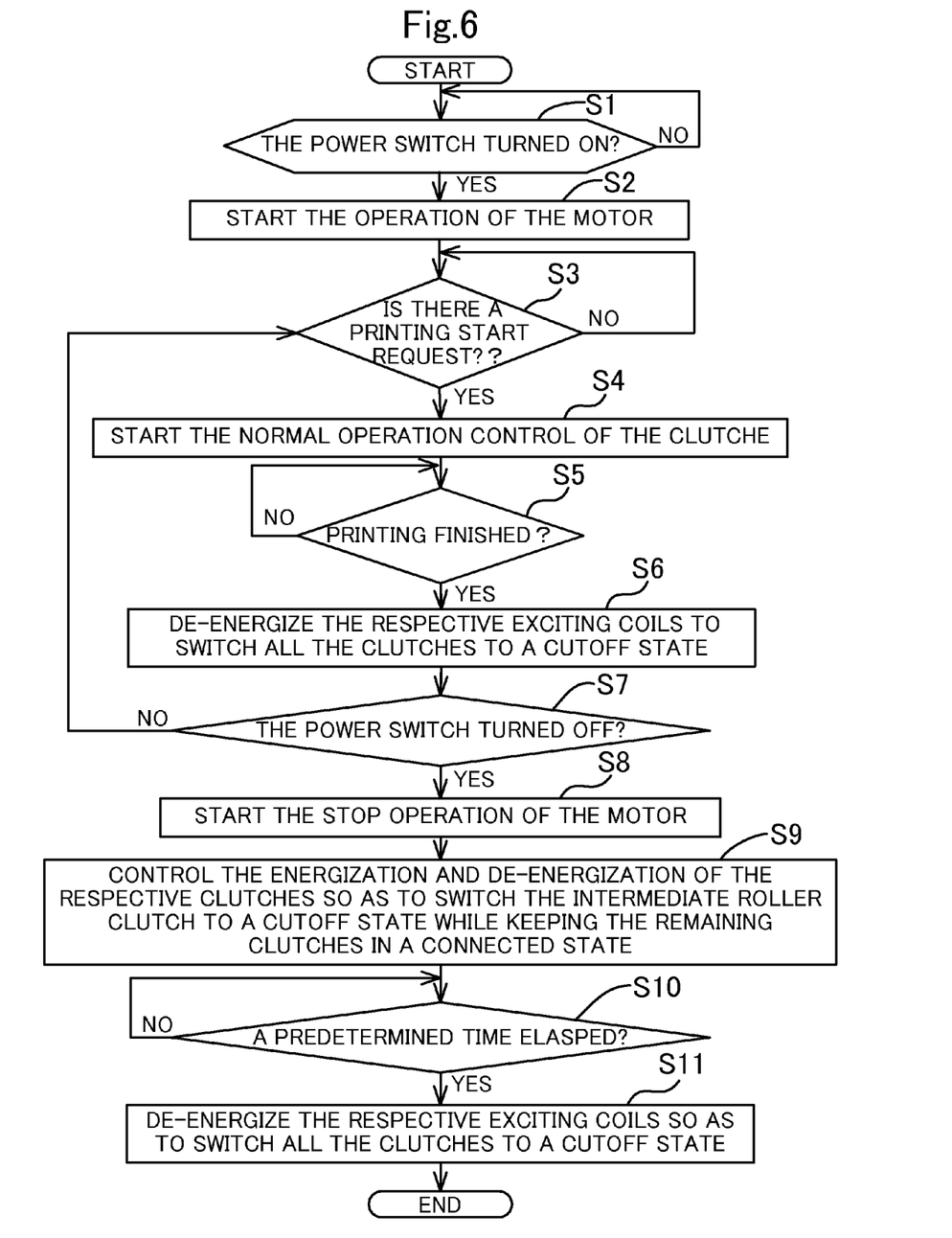
FIG. 6 is a flowchart showing the motor control and the clutch control performed by a controller.

Next, the details of the motor control and the clutch control performed by the controller 50 will be described with reference to a flowchart shown in FIG. 6.

In step S1, based on the signal sent from the power switch 54, the motor control unit 51 and the clutch control unit 52 determine whether the power switch 54 is turned on. If the determination is NO, the processing of step S1 is performed again. If the determination is YES, the flow proceeds to step S2.

In step S2, the motor control unit 51 outputs an operation signal to the motor 59.

In step S3, based on the information sent from the reception unit 53, the motor control unit 51 and the clutch control unit 52 determine whether there is a printing start request. If the determination is NO, the processing of step S3 is performed again. If the determination is YES, the flow proceeds to step S4.

In step S4, based on the information sent from the paper detecting sensor 55, the clutch control unit 52 starts the normal operation control of each of the clutches 60a to 60d.

In step S5, based on the printing image information and the information of number of printing sheets sent from the reception unit 53, the motor control unit 51 and the clutch control unit 52 determine whether the printing is finished. If the determination is NO, the processing of step S5 is performed again. If the determination is YES, the flow proceeds to step S6.

In step S6, the clutch control unit 52 turns off the energization of the exciting coils 75 of the respective clutches 60a to 60d.

In step S7, based on the signal sent from the power switch 54, the motor control unit 51 and the clutch control unit 52 determine whether the power switch 54 is turned on. If the determination is NO, the flow returns to step S3. If the determination is YES, the flow proceeds to step S8.

In step S8, the motor control unit 51 outputs a stop signal to the motor 59.

In step S9, the clutch control unit 52 de-energizes the exciting coil 75 of the intermediate roller clutch 60b (one or more but not all of the clutches) and energizes the exciting coils 75 of the paper feeding roller clutch 60c, the register roller clutch 60a and the double-side printing roller clutch 60d (the remaining clutches).

In step S10, determination is made as to whether a predetermined time is elapsed after performing the processing of step S8. If the determination is NO, the processing of step S10 is performed again. If the determination is YES, the flow proceeds to step S11. It is preferred that the predetermined time is longer than the stop time required in stopping the motor 59.

In step S11, the clutch control unit 52 de-energizes the exciting coils 75 of the entire clutches 60a to 60d. Thereafter, the flow comes to an end.

In the embodiment described above, when the motor control unit 51 outputs a stop signal to the motor 59 (performs the processing of step S8) and stops the motor 59 from an operating state, the clutch control unit 52 controls the energization and de-energization of the exciting coils 75 of the respective electromagnetic clutches 60a to 60d (performs the processing of step S9) so as to switch only the intermediate roller clutch 60b of the four electromagnetic clutches 60a to 60d to a cutoff state while keeping the remaining electromagnetic clutches 60a, 60c and 60d in a connected state.

Accordingly, when the motor control unit 51 stops the motor 59, as compared with a case where all the electromagnetic clutches are simultaneously switched to a cutoff state, the load torque acting on the output shaft 61 of the motor 59 can be increased just as much as the load torque obtained by keeping the remaining electromagnetic clutches 60a, 60c and 60d in a connected state. This makes it possible to increase the stop acceleration A of the motor 59 (see FIG. 7). The stop acceleration A referred to herein is a value given by an equation $A=N/\Delta T$ where $\Delta T$ is the stop time required in stopping the motor 59 rotating at a rotation speed N.

Figure 7:
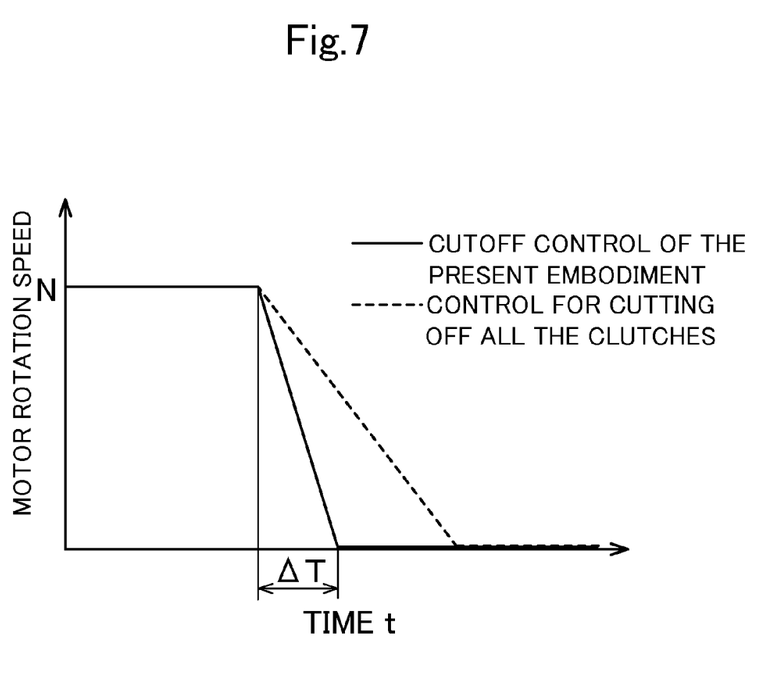
FIG. 7 is a graph showing a time-dependent change of a rotation speed of a motor when the motor is stooped.

By increasing the stop acceleration A of the motor 59 when stopping the motor 59, it is possible to increase the inertial force acting on the armature 72 of the intermediate roller clutch 60b. The increased inertial force can relieve the sticking of the armature 72 and the rotor 73 of the intermediate roller clutch 60b, thereby preventing the armature 72 and the rotor 73 from becoming unable to move away from each other. Moreover, it is possible to prevent occurrence of a jam of the paper P and breakage of the driving unit 40 which may otherwise be caused by unintentional operation of the intermediate roller pair 31.

The intermediate roller clutch 60b is one of the four electromagnetic clutches 60a to 60d in which the load torque applied from the driven body 90 to the coupling portion of the rotor 73 and the armature 72 through the output shaft 74 remains smallest in the connected state. Accordingly, it can be said that, among the four electromagnetic clutches 60a to 60d, the intermediate roller clutch 60b is the clutch in which sticking is most likely to occur. In the aforementioned embodiment, it is possible to reliably relieve the sticking of the intermediate roller clutch 60b in which sticking is most likely to occur.

Unlike the aforementioned embodiment, the technology of the present disclosure may be configured as follows.

While an example in which the driving device 100 is applied to the image forming apparatus 1 is illustrated in the aforementioned embodiment, the present disclosure is not limited thereto but may be applied to a drive system of, e.g., a pinball game machine.

In the aforementioned embodiment, in step S9, only one clutch (the intermediate roller clutch 60b) is switched to a cutoff state while keeping the remaining three clutches 60a, 60c and 60d in a connected state. However, the present disclosure is not limited thereto. For example, two clutches may be switched to a cutoff state while keeping the remaining two clutches in a connected state. Alternatively, three clutches may be switched to a cutoff state while keeping the remaining one clutch in a connected state. That is to say, the processing of step S9 may be any processing in which one or more but not all of the clutches 60a to 60d is switched to a cutoff state while keeping the remaining clutches in a connected state.

The number of the clutches 60a to 60d arranged within the driving unit 40 is not limited to four. It goes without saying that the number of clutches may be, e.g., two, three, five or more.

In the aforementioned embodiment, the four clutches 60a to 60d and the motor 59 are arranged within a single case 58 and are formed into a unit. However, the four clutches 60a to 60d and the motor 59 need not be necessarily formed into a unit.

In the aforementioned embodiment, the respective clutches 60a to 60d are configured such that they are kept in a connected state by the energization of the exciting coils 75 and are switched to a cutoff state upon de-energizing the exciting coils 75. However, the operation of the respective clutches 60a to 60d is not limited thereto but may be reversed. That is to say, the respective clutches 60a to 60d may be configured such that they are kept in a cutoff state by the energization of the exciting coils 75 and are switched to a connected state upon de-energizing the exciting coils 75.

As described above, the technology of the present disclosure is useful in a driving device that includes a motor and a plurality of electromagnetic clutches respectively installed in a power delivery route between the motor and a plurality of driven bodies. In particular, the technology of the present disclosure is useful if applied to a driving device of an image forming apparatus.

What is claimed is:

1. A driving device, comprising:
   a motor;
   a plurality of electromagnetic clutches respectively installed in a power delivery route between the motor and a plurality of driven bodies, each of the electromagnetic clutches including an input member driven by the motor, an armature connected to the input member so as to rotate together with the input member, a rotor arranged in a coaxial relationship with the armature, an output member interconnecting the rotor and each of the driven bodies so as to rotate together and an exciting coil configured to generate a magnetic force;
   a motor control unit configured to control an operation of the motor; and
   a clutch control unit configured to, by controlling energization and de-energization of the exciting coil of each of the electromagnetic clutches, selectively switch each of the electromagnetic clutches to a connected state in which the armature and the rotor are connected to each other and a cutoff state in which the connection of the armature and the rotor is cut off,
   wherein, when the motor control unit stops the motor from an operating state, the clutch control unit controls the energization and de-energization of the exciting coil of each of the electromagnetic clutches so as to switch one or more but not all of the electromagnetic clutches to the cutoff state while keeping the remaining electromagnetic clutches in the connected state.

2. The driving device of claim 1, wherein the one or more but not all of the electromagnetic clutches is one of the electromagnetic clutches in which a load torque applied from each of the driven bodies to a coupling portion of the rotor and the armature through the output member remains smallest in the connected state.

3. An electronic apparatus comprising the driving device of claim 1.

4. A control method of a driving device including a motor and a plurality of electromagnetic clutches respectively installed in a power delivery route between the motor and a plurality of driven bodies, the method comprising:

when the motor is stopped from an operating state, controlling energization and de-energization of an exciting coil of each of the electromagnetic clutches so as to switch one or more but not all of the electromagnetic clutches to a cutoff state while keeping the remaining electromagnetic clutches in a connected state.

* * * * *